(12) United States Patent
Thijssen (10) Patent No.: US 10,517,161 B2
(45) Date of Patent: Dec. 24, 2019

(54) CONNECTED DEVICE SYSTEM (71) Applicant: SIGNIFY HOLDING B.V., Eindhoven (NL)

(72) Inventor: Paulus Thomas Arnoldus Thijssen, Goirle (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/563,890

(22) PCT Filed: Mar. 21, 2016

(86) PCT No.: PCT/EP2016/056162
§ 371 (c)(1),
(2) Date: Oct. 2, 2017

(87) PCT Pub. No.: WO2016/156090
PCT Pub. Date: Oct. 6, 2016

(65) Prior Publication Data
US 2018/0124902 A1 May 3, 2018

(30) Foreign Application Priority Data

Apr. 2, 2015 (EP) ..................................... 15162321

(51) Int. Cl.
*H05B 37/02* (2006.01)
*G08C 23/04* (2006.01)
(Continued)

(52) U.S. Cl.
CPC ......... *H05B 37/0272* (2013.01); *G08C 23/04* (2013.01); *H04Q 9/00* (2013.01);
(Continued)

(58) Field of Classification Search
CPC .. G08C 23/04; H04Q 9/00; H04Q 2213/1301; H04W 24/02; H05B 37/0254; H05B 37/0272
See application file for complete search history.

(56) References Cited

U.S. PATENT DOCUMENTS 8,248,467 B1 * 8/2012 Ganick ................ G01C 21/206
348/116
2009/0026966 A1 * 1/2009 Budde .................... H05B 37/02
315/152
(Continued)

FOREIGN PATENT DOCUMENTS

WO 2007102097 A1 9/2007
WO 2008078256 A2 7/2008

OTHER PUBLICATIONS

Allseen Alliance, Lighting Sdk Android: "Getting Started with the AllJoyn (TM) Lighting Service Framework 14.06", Sep. 30, 2014 (Sep. 30, 2014), XP055234122.*
(Continued)

*Primary Examiner* — Alexander H Taningco
*Assistant Examiner* — Kurtis R Bahr
(74) *Attorney, Agent, or Firm* — Meenakshy Chakravorty (57) ABSTRACT

The present invention provides a connected device system, comprising a master network device (2) and a device (5) to be integrated into the connected device system (1). The connected device system is adapted to connect the master network device and the device via a wireless network (4). When being added to the wireless network, the device announces itself in the wireless network and provides an upgrade server in the wireless net-work. The upgrade server makes available for retrieval a digital asset indicative of a characteristic of the device. The master network device detects the device in the wireless network based on the announcement, searches for the upgrade server of the device
(Continued)

in the wireless network in response to the detection of the device, and retrieves the digital asset from the upgrade server of the device. This leads to an improved way of integrating the device into the connected device system.

14 Claims, 3 Drawing Sheets

(51) Int. Cl.
*H04Q 9/00* (2006.01)
*H04W 24/02* (2009.01)

(52) U.S. Cl.
CPC ........ *H04W 24/02* (2013.01); *H05B 37/0254* (2013.01); *H04Q 2213/1301* (2013.01)

(56) References Cited

U.S. PATENT DOCUMENTS

| | | | | |
|---|---|---|---|---|
| 2010/0091686 | A1* | 4/2010 | Rutjes | H04L 41/0806 370/254 |
| 2012/0217882 | A1* | 8/2012 | Wong | F21V 23/0464 315/185 R |
| 2016/0366751 | A1* | 12/2016 | Xu | H05B 37/02 |

OTHER PUBLICATIONS

Lighting SDK Android, "Getting Started With Alljoyn Lighting Service Framework 14.06," Allseen Alliance, Sep. 30, 2014 (11 pages).

Zigbee Light Link User Guide, NXP, JN-UG-3091, Revision 1.2, Feb. 24, 2015 (180 Pages).

\* cited by examiner

CONNECTED DEVICE SYSTEM

CROSS-REFERENCE TO PRIOR APPLICATIONS

This application is the U.S. National Phase application under 35 U.S.C. § 371 of International Application No. PCT/EP2016/056162, filed on Mar. 21, 2016, which claims the benefit of European Patent Application No. 15162321.2, filed on Apr. 2, 2015. These applications are hereby incorporated by reference herein.

FIELD OF THE INVENTION

The invention relates to a connected device system comprising a master network device and a device to be integrated into the connected device system, wherein the connected device system is adapted to connect the master network device and the device via a wireless network. The invention further relates to a master network device and a device for being used in the connected device system. Moreover, the invention relates to an integration method for integrating a device into a connected device system.

BACKGROUND OF THE INVENTION

In a connected lighting system, for instance, the Philips Hue system, a plurality of lighting devices may be connected to a master network device, such as a bridge, via a wireless network. The lighting devices, which may typically include light emitting diodes (LEDs), can be controlled wirelessly via the master network device, for instance, with regards to their hue or their switch-on/switch-off time. To this end, a smartphone that can be connected to the master network device may execute an app in order to wirelessly control the lighting devices via the master network device.

In the connected lighting system, it can be foreseen that various kinds of devices, for instance, lighting devices, light switches, sensors, such as presence detectors, et cetera, from different manufacturers can be integrated into the connected lighting system. For instance, the Philips Hue system has been opened via the "Friends of Hue" program for extension by devices from third party manufacturers.

The paper "Getting Started with the AllJoyn™ Lighting Service Framework 14.06" by the Allseen Alliance (Sep. 30, 2014) describes the AllJoyn™ Lighting SDK, which provides a simple Lighting API to application developers to build AllJoyn™ applications to control the Lighting solution provided by the Lighting service framework. The Lighting service framework comprises two service components. A Lamp service that enables an embedded lighting device (such as a connected light bulb) to be controlled by the Controller service and a Controller service that enables AllJoyn™ applications (e.g., an application running on a smartphone) to control the Lamp service.

WO 2007/102097 A1 discloses a lighting system and a method of operating the lighting system. A plurality of lighting units each comprise a lighting element with a lighting control unit for controlling its light output and a communication unit for communicating over a communication medium, e.g. RE or power line communication. The units further have an optical receiver for receiving light from other lighting units. A controller unit is connected to the optical receiver, the communication unit and the lighting control unit. In order to allow easy, automated set-up, at least in a configuration phase, the lighting units send information by operating the lighting elements in a modulated manner and this information is received by a further lighting unit observing the generated light.

SUMMARY OF THE INVENTION

If the integration of devices into the connected lighting system is foreseen, in the case that the connected lighting system does not know a specific device, it may be difficult to integrate and/or control the device due to a lack of knowledge about specific characteristics of the device.

It is an object of the invention to provide a connected device system comprising a master network device and a device to be integrated into the connected device system, wherein the connected device system is adapted to connect the master network device and the device via a wireless network, which allows for an improved way of integrating a device into the connected device system. It is a further object of the invention to provide a master network device and a device for being used in the connected device system. Moreover, it is an object of the invention to provide an integration method for integrating a device into a connected device system.

In a first aspect of the invention, a connected device system is presented, wherein the connected device system comprises:

a master network device and a device to be integrated into the connected device system, wherein the connected device system is adapted to connect the master network device and the device via a wireless network, wherein the device is adapted, when being added to the wireless network, to announce itself in the wireless network and to provide an upgrade server in the wireless network, wherein the upgrade server makes available for retrieval a digital asset indicative of a characteristic of the device, and wherein the master network device is adapted to detect the device in the wireless network based on the announcement, to search for the upgrade server of the device in the wireless network in response to the detection of the device, and to retrieve the digital asset from the upgrade server of the device.

Since the device to be integrated into the connected device system provides an upgrade server in the wireless network and makes available for retrieval a digital asset indicative of a characteristic of the device, and since the master network device searches for the upgrade server of the device in the wireless network in response to the detection of the device and retrieves the digital asset from the upgrade server of the device, specific characteristics of the device, which may be required or at least helpful for integrating and/or controlling the device, can be provided to the connected device system by the device itself. Thus, if the device is provided by a third party manufacturer and/or is a newly designed or refined device that is not yet known by the connected device system, the integration of the device into the connected device system may preferably not require separate steps or ways of providing information about specific characteristics of the device to the connected device system. This can lead to an improved way of integrating the device into the connected device system.

Preferably, the connected device system comprises multiple devices to be integrated into the connected device system.

It is preferred that the master network device is adapted to provide an upgrade server in the wireless network and to stop providing the upgrade server in the wireless network in response to the detection of the device. In such a configuration, the upgrade server of the master network device may make available for retrieval a digital asset comprising, for example, a firmware update for updating the firmware of a device. Devices comprised by the connected device system can then be adapted to search for the upgrade server of the master network device in the wireless network and to retrieve the digital asset from the upgrade server of the master network device. In cases where no mechanism is foreseen for distinguishing the upgrade server of the master network device and the upgrade server of a device to be integrated into the connected device system, i.e., where the devices and the master network device would not be able to determine whether they found the upgrade server of the master network device or the upgrade server of a device to be integrated into the connected device system, the master network device may not be able to correctly find the upgrade server of a device to be integrated into the connected device system if it provides its own upgrade server at the same time. It is therefore advantageous if, for the integration of the device, the master network device stops providing its own upgrade server in the wireless network.

The upgrade server of the device to be integrated into the connected device system and the upgrade server of the master network device are preferably of the same kind, e.g., they may provide the same interface resp. communication to a device that wants to retrieve a digital asset from the upgrade server. This way, only one kind of upgrade server must be provided, resulting in a simplification of the overall system architecture.

It is further preferred that the device is adapted to stop providing the upgrade server in the wireless network after the retrieval of the digital asset from the upgrade server of the device has been completed and/or after a predetermined delay time. As described above, the connected device system preferably comprises multiple devices to be integrated into the connected device system. In order to avoid conflicts, for instance, when the devices to be integrated into the connected device system search for the upgrade server of the master network device in the wireless network, a device to be integrated into the connected device system should only provide its own upgrade server in the wireless network as long as necessary, i.e., until the retrieval of the digital asset from the upgrade server of the device to be integrated into the connected device system has been completed. Moreover, the additional or alternative use of a predetermined delay time after which the device to be integrated into the connected device system stops providing its update server makes it possible to prevent that the device to be integrated into the connected device system provides the upgrade server in the wireless network "endlessly" in cases where, for instance, the digital asset is not retrieved in time or is not retrieved at all.

It is preferred that the master network device is adapted to transmit a completion information indicative of the completion of the retrieval of the digital asset from the upgrade server of the device, wherein the device is adapted to perform the stopping in response to the reception of the completion information. In this way, the master network device can signal the device to be integrated into the connected device system that the retrieval of the digital asset from the upgrade server of the device to be integrated into the connected device system has been completed, such that the device to be integrated into the connected device system can now stop providing the upgrade server in the wireless network.

It is further preferred that the master network device is adapted, if a further device to be integrated into the connected device system has been detected, to search for the upgrade server of the further device after the retrieval of the digital asset from the upgrade server of the device has been completed. Once the master network device has found the upgrade server of the further device to be integrated into the connected device system, it can then also retrieve the digital asset from the upgrade server of the further device to be integrated into the connected device system. This may allow for a simple way of integrating multiple devices into the connected device system together.

It is preferred that the master network device is adapted, if no further device to be integrated into the connected device system has been detected, to provide an upgrade server in the wireless network after the retrieval of the digital asset from the upgrade server of the device has been completed. As described above, the upgrade server of the master network device may make available for retrieval a digital asset comprising, for example, a firmware update for updating the firmware of a device. Devices comprised by the connected device system can then be adapted to search for the upgrade server of the master network device in the wireless network and to retrieve the digital asset from the upgrade server of the master network device. Again, the upgrade server of the device to be integrated into the connected device system and the upgrade server of the master network device are preferably of the same kind, e.g., they may provide the same interface resp. communication to a device that wants to retrieve a digital asset from the upgrade server.

It is preferred that the master network device is adapted to provide an upgrade server in the wireless network, wherein the device is adapted to search for the upgrade server of the master network device in the wireless network, wherein the search is only started after a predetermined delay time. As described above, in cases where no mechanism is foreseen for distinguishing the upgrade server of the master network device and the upgrade server of a device to be integrated into the connected device system, conflicts could arise if a device, after having been integrated to the wireless network, already starts the search for the upgrade server of the master network device in the wireless network while a further device to be integrated into the connected device system provides its upgrade server in the wireless network at the same time. In order to avoid such conflicts, a predetermined delay time is introduced, such that the integration of all devices has most likely been completed before the search for the upgrade server of the master network device in the wireless network is started. As described above, the upgrade server of the device to be integrated into the connected device system and the upgrade server of the master network device are preferably of the same kind, e.g., they may provide the same interface resp. communication to a device that wants to retrieve a digital asset from the upgrade server.

The predetermined delay time is preferably a random delay time within a predetermined range of delay times, for instance, within a range of delay times from 2 to 10 minutes. Such a random delay time is useful to ensure that in a connected device system comprising multiple devices to be integrated into the connected device system, the communication of the devices to be integrated into the connected device system with the upgrade server of the master network device is distributed in time, such that the upgrade server of the master network device can sequentially handle the communication with the devices to be integrated into the connected device system. The predetermined delay time may start when the device to be integrated into connected device system is added to resp. joins the wireless network. Moreover, after the device has been integrated into the connected device system, the process of searching for the upgrade server of the master network device in the wireless network may be performed again after the device is powered on and/or rejoined the wireless network. Also in these cases, a predetermined delay time may be foreseen, as described above.

It is preferred that the digital asset comprises one or more of an information indicative of a type and/or variant of the device and an information indicative of the identity and/or configuration of the device. If the device is provided by a third party manufacturer and/or is a newly designed or refined device that is not yet known by the connected device system, the information indicative of the type and/or variant of the device can support the integration and/or control of the device. For instance, as described in more detail below, a user interface of the connected device system may make use of pictograms for representing the devices comprised by the connected device system. By making available for retrieval, by the upgrade server of the device, a digital asset comprising a pictogram for representing the device, it can be ensured that the pictogram for representing the device is available to the user interface.

Moreover, in cases where the master network device, when finding an upgrade server, has no means of knowing which device provides the upgrade server, the information indicative of the identity of the device can be used for associating the digital asset with the device. This association can then be utilized when the digital asset is further used in the integration and/or control of the device.

The device to be integrated into the connected device system can also be a device that has been used before (or was intended to be used) in a "standalone" device configuration, in which, for instance, a controller, such as a remote control or a light switch, directly controls the device (which may, for instance, be a lighting device). In order to transfer the device from the "standalone" device configuration to the connected device system comprising the master network device (and possibly further devices), it can be helpful, as one step in this process, to transfer the parts of the standalone configuration that are known by the device itself to the master network device.

It is further preferred that the master network device is adapted to locally store the contents of the digital asset and to associate them with the device. By doing so, the digital asset and the association with the device to be integrated into the connected device system is centrally available at the master network device of the connected device system, such that it is easily accessible in the connected device system.

If is preferred that the digital asset is made available as a digital asset file and the master network device is adapted to download the digital asset file from the upgrade server. Preferably, the digital asset file has a format that describes the contents of the digital asset file. For instance, the digital asset file may be provided in an XML (eXtensible Markup Language) format.

It is further preferred that the connected device system further comprises:
  a mobile device that is adapted to connect to the master network device and to execute a program for wirelessly controlling the device via the master network device,
  wherein the master network device is adapted to make the contents of the digital asset available to the mobile device.

The mobile device can be a smartphone, a tablet computer, a remote control or the like, and the program executed by the mobile device can be, for instance, an app. The app can provide a user interface that makes use of pictograms for representing the devices comprised by the connected device system, as described above. Since the master network device is adapted to make the contents of the digital asset available to the mobile device, it can be ensured that the contents of the digital asset comprising, for instance, a pictogram for representing the device to be integrated into the connected device system, are available to the user interface. It is preferred that the connected device system is a connected lighting system.

In the connected lighting system, the device to be integrated into the connected device system can be a lighting device, a light switch, a sensor, such as a presence detector, et cetera. If the connected lighting system comprises multiple devices to be integrated into the connected device system, the multiple devices to be integrated into the connected device system can also be combinations of lighting devices, light switches, sensors, such as presence sensors, et cetera. The connected lighting system may allow control of several of the devices via the master network device. For instance, lighting devices comprised by connected lighting system may be controlled by means of the program executed by the mobile device with regards to their hue or their switch-on/switch-off time. Also, input from a light switch or a presence sensor comprised by the connected lighting system may be used for controlling switch-on/switch-off of the lighting devices. Of course, more advanced control concepts may be used in the connected lighting system. For instance, audio sensors may be used in the connected lighting system to sense acoustic event, such as a clapping of the hands, a whistling or the speaking of a certain phrase, wherein the lighting devices may then be controlled in response to the detection of such acoustic events.

The communication in the connected device system, for instance, between the master network device and the device to be integrated into the connected device system, is preferably based at least in part on an open standard protocol, such as the ZigBee protocol developed by the ZigBee Alliance. In particular, if the connected device system is a connected lighting system, the communication makes use of ZigBee Light Link, which is a global standard for interoperable and easy-to-use lighting and control products. This standard allows users to gain wireless control over different devices, such as LED fixtures, light bulbs, timers, remotes and switches. If the ZigBee protocol, in particular, ZigBee Light Link, is used, the upgrade server provided by the master network device and/or the device to be integrated into the connected device system is preferably a ZigBee over-the-air (OTA) upgrade server.

In a further aspect of the invention, a master network device for being used in a connected device system as defined in claim 1 is presented,
  wherein the master network device is adapted to detect the device in the wireless network based on the announcement, to search for the upgrade server of the device in the wireless network in response to the detection of the device, and to retrieve the digital asset from the upgrade server of the device.

In a further aspect of the invention, a device for being used in a connected device system as defined in claim 1 is presented,
  wherein the device is adapted, when being added to the wireless network, to announce itself in the wireless network and to provide the upgrade server in the wireless network, wherein the upgrade server makes available for retrieval a digital asset indicative of a characteristic of the device.

In a further aspect of the invention, an integration method for integrating a device into a connected device system comprising a master network device and the device to be integrated into the connected device system is presented, wherein the connected device system is adapted to connect the master network device and the device via a wireless network, wherein the method comprises:

the device, when being added to the wireless network, announcing itself in the wireless network and providing an upgrade server in the wireless network, wherein the upgrade server makes available for retrieval a digital asset indicative of a characteristic of the device, and the master network device detecting the device in the wireless network based on the announcement, searching for the upgrade server of the device in the wireless network in response to the detection of the device, and retrieving the digital asset from the upgrade server of the device.

In a further aspect of the present invention a computer program for controlling a connected device system as defined in claim 1 is presented, wherein the computer program comprises program code means for causing the connected device system to carry out the integration method as defined in claim 14, when the computer program is run on the connected device system.

The computer program may comprise several subprograms, wherein, for instance, a first subprogram may be implemented on the master network device and a second subprogram may be implemented on the device, in order to control these elements in accordance with the integration method.

It shall be understood that the independent claims have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
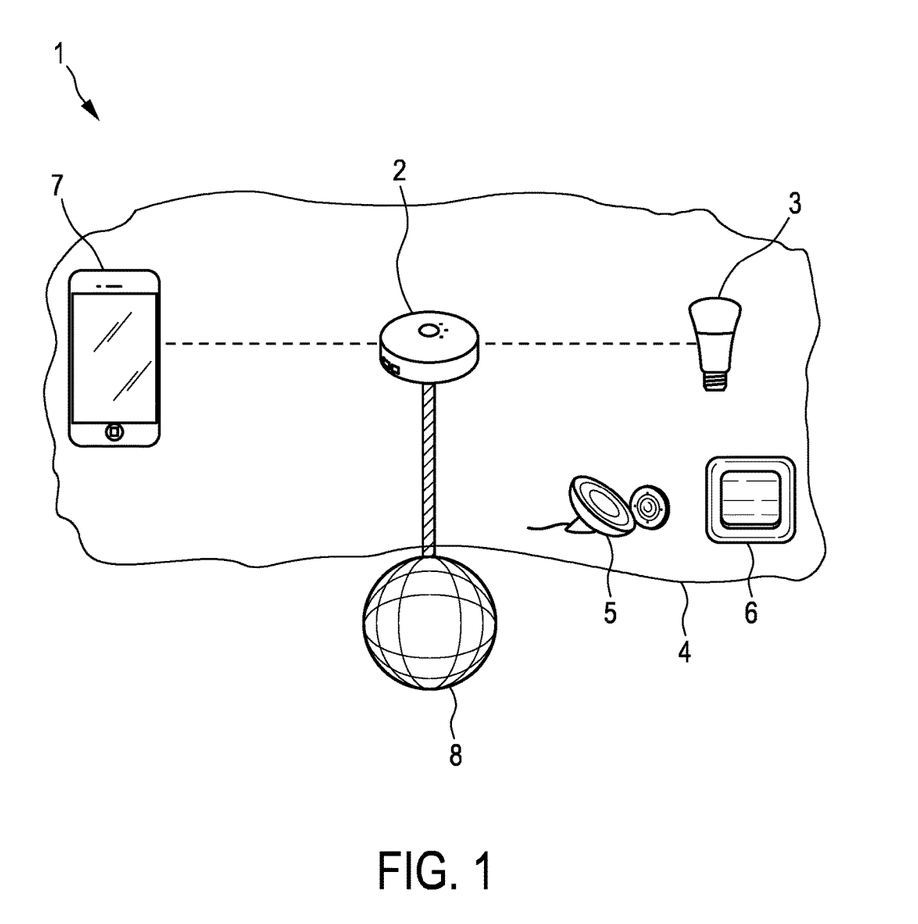
FIG. 1 shows schematically and exemplarily an embodiment of a connected device system comprising a master network device and a device to be integrated into the connected device system.

FIG. 1 shows schematically and exemplarily an embodiment of a connected device system 1 comprising a master network device 2 and a device 5 to be integrated into the connected device system 1. In this embodiment, the connected device system 1 is a connected lighting system. The connected lighting system 1 is adapted to connect the master network device 2, which, in this embodiment, is a bridge, and the device 5, here, a lighting device, via a wireless network 4.

The connected lighting system 1 further comprises a mobile device 7, here, a smartphone, that is adapted to connect to the bridge 2 and to execute a program, in particular, an app, for wirelessly controlling the lighting device 5 via the bridge 2. For instance, the app may allow controlling the lighting device 5 with regards to its hue or its switch-on/switch-off time.

The lighting device 5 is adapted, when being added to the wireless network 4, to announce itself in the wireless network 4 and to provide an upgrade server in the wireless network 4, wherein the upgrade server makes available for retrieval a digital asset indicative of a characteristic of the lighting device 5. Moreover, the bridge 2 is adapted to detect the lighting device 5 in the wireless network 4 based on the announcement, to search for the upgrade server of the lighting device 5 in the wireless network 4 in response to the detection of the lighting device 5, and to retrieve the digital asset from the upgrade server of the lighting device 5. As described above, by means of this configuration, specific characteristics of the lighting device 5, which may be required or at least helpful for integrating and/or controlling the lighting device 5 can be provided to the connected lighting system 1 by the lighting device 5 itself.

For instance, in the present embodiment, the app provides a user interface that makes use of pictograms for representing the devices comprised by the connected lighting system 1. If the lighting device 5 is provided by a third party manufacturer and/or is a newly designed or refined device that is not yet known by the connected lighting system 1, the app may not have available a suitable pictogram for representing the lighting device 5. In this case, it may only use an already available pictogram, such as a default pictogram indicating a newly integrated (lighting) device.

In view thereof, the digital asset that is made available for retrieval, by the upgrade server of the lighting device 5, comprises a pictogram for representing the lighting device 5, and the bridge 2 is adapted to make the contents of the digital asset available to the smartphone 7. Thus, it can be ensured that the pictogram for representing the device is available to the user interface. Moreover, the digital asset, in this embodiment, further comprises an information indicative of the identity of the lighting device 5. This information is used for associating the digital asset with the lighting device 5. The bridge 2, here, locally stores the contents of the digital asset and associates them with the lighting device 5.

In this example, the digital asset is made available as a digital asset file and the bridge 2 is adapted to download the digital asset file from the upgrade server of the lighting device 5. In other embodiments, it would also be possible that the digital asset is streamed by the upgrade server of the lighting device 5 to the bridge 2. Preferably, the digital asset file has a format that describes the contents of the digital asset file. For instance, the digital asset file may be provided in an XML (eXtensible Markup Language) format.

Here, the bridge 2 is further adapted to connect to a portal 8 on the Internet. The portal 8 may provide an online control panel that allows a user of the connected lighting system 1 to connect to and control the connected lighting system 1 from anywhere in the world. This may allow the user, for instance, to switch off the lights if he/she finds that he/she will be home later than he/she originally thought. In addition, the portal 8 may also be adapted to store personalized lighting scenarios and "light recipes" and/or to (automatically) upgrade the software of the bridge 2.

In this embodiment, the bridge 2 is adapted to provide an upgrade server in the wireless network 4 and to stop the upgrade server in response to the detection of the lighting device 5. The upgrade server of the bridge 2 makes available for retrieval a digital asset comprising, for example, a firmware update for updating the firmware of a device. Moreover, the lighting device 5 is adapted to stop providing the upgrade server in the wireless network 4 after the retrieval of the digital asset from the upgrade server of the lighting device 5 has been completed. In particular, the bridge 2 is adapted to transmit a completion information indicative of the completion of the retrieval of the digital asset from the upgrade server of the lighting device 5, wherein the lighting device 5 is adapted to perform the stopping in response to the reception of the completion information. In other embodiments, the lighting device 5 can additionally or alternatively also be adapted to stop providing the upgrade server in the wireless network 4 after a predetermined delay time.

The bridge 2 is adapted, if a further device 6, here, for instance, a light switch, to be integrated into the connected lighting system 1 has been detected, to search for the upgrade server of the light switch 6 after the retrieval of the digital asset from the upgrade server of the lighting device 5 has been completed. Once the bridge 2 has found the upgrade server of the light switch 6, it can then also retrieve the digital asset from the upgrade server of the light switch 6. On the other hand, the bridge 2 is adapted, if no further device to be integrated into the connected lighting system 1 has been detected, to provide an upgrade server in the wireless network 4 after the retrieval of the digital asset from the upgrade server of the lighting device 5 has been completed. As described above, the upgrade server of the bridge 2 makes available for retrieval a digital asset comprising, for example, a firmware update for updating the firmware of a device.

In this embodiment, the lighting device 5 is adapted to search for the upgrade server of the bridge 2 in the wireless network 4, wherein the search is only started a predetermined delay time after the lighting device 5 has been added to the wireless network 4. The predetermined delay time, in this embodiment, is a random delay time within a predetermined range of delay times, for instance, within a range of delay times from 2 to 10 minutes. The predetermined delay time starts when the lighting device 5 is added to resp. joins the wireless network 4. Moreover, after the lighting device 5 has been integrated into the connected lighting system 1, the process of searching for the upgrade server of the bridge 2 in the wireless network 4 is performed again after the lighting device 5 is powered on and/or rejoined the wireless network 4. Also in these cases, a predetermined delay time is foreseen, as described above.

Here, the communication in the connected lighting system 1, for instance, between the bridge 2 and the lighting device 5, is based at least in part on an open standard protocol, in particular, the ZigBee protocol developed by the ZigBee Alliance. In more detail, the communication makes use of ZigBee Light Link, which is a global standard for interoperable and easy-to-use lighting and control products. The upgrade server provided by the bridge 2 and/or the lighting device 5 is a ZigBee over-the-air (OTA) upgrade server.

Figure 2:
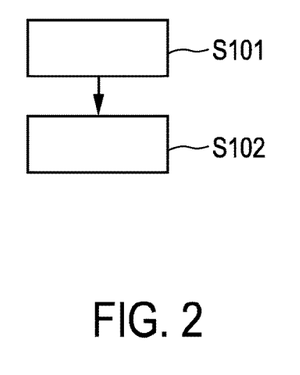
FIG. 2 shows a flowchart exemplarily illustrating an embodiment of an integration method for integrating a device into the connected device system shown in FIG. 1.

In the following, an embodiment of an integration method for integrating a device 5 into the connected device system 1 shown in FIG. 1 will exemplarily be described with reference to a flowchart shown in FIG. 2. As described with reference to FIG. 1 above, in this embodiment, the connected device system 1 is a connected lighting system, the master network device 2 is a bridge, and the device 5 is a lighting device.

In step S101, the lighting device 5, when being added to the wireless network 4, announces itself in the wireless network 4 and provides an upgrade server in the wireless network 4, wherein the upgrade server makes available for retrieval a digital asset indicative of a characteristic of the lighting device 5.

In step 102, the bridge 2 detects the lighting device 5 in the wireless network 4 based on the announcement, searches for the upgrade server of the lighting device 5 in the wireless network 4 in response to the detection of the lighting device 5, and retrieves the digital asset from the upgrade server of the lighting device 5.

Figure 3:
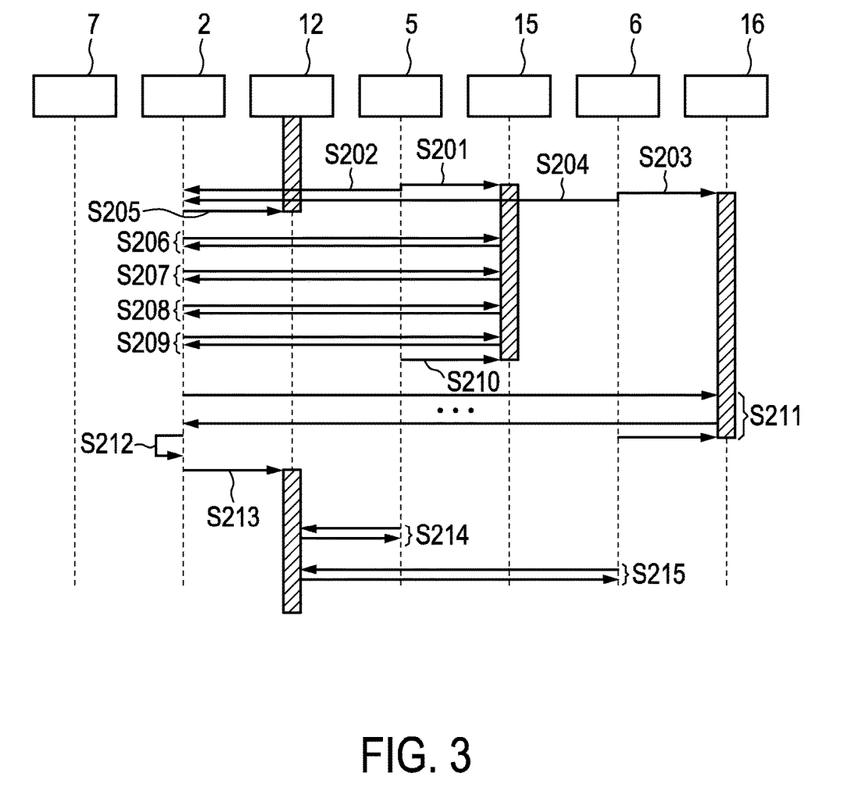
FIG. 3 shows a more detailed flowchart exemplarily illustrating a sequence of operations performed during the integration of two devices into the connected device system shown in FIG. 1.

A more detailed flowchart exemplarily illustrating a sequence of operations performed during the integration of two devices 5, 6 into the connected device system 1 shown in FIG. 1 is shown in FIG. 3. As described with reference to FIG. 1 above, in this embodiment, the connected device system 1 is a connected lighting system, the master network device 2 is a bridge, the device 5 is a lighting device, and the further device 6 is a light switch, wherein it is assumed that the lighting device 5 and the light switch 6 are integrated into the connected lighting system 1 together. FIG. 3 shows, in addition to the elements shown in FIG. 1, the upgrade servers 12, 15, 16 provided by the bridge 2, the lighting device 5, and the light switch 6. In the figure, the sequence of operations is exemplarily illustrated sequentially from top to bottom.

The integration of the lighting device 5 and the light switch 6 is started in a state in which the bridge 2 provides an upgrade server 12 in the wireless network 4. When being added to the wireless network 4 (not shown in the figure), in step S201, the lighting device 5 provides an upgrade server 15 in the wireless network 4, and, in step S202, announces itself in the wireless network 4. Only slightly later, the same steps are performed by the light switch 6, i.e., in step S203, the light switch 6 provides an upgrade server 16 in the wireless network 4, and, in step S204, announces itself in the wireless network 4. Both the upgrade servers 14, 16 of the lighting device 5 and of the light switch 6 make available for retrieval a digital asset indicative of a characteristic of the respective device.

The bridge 2 detects the lighting device 5 and the light switch 6 based on the respective announcement (step not shown in the figure) and, in step S205, stops the upgrade server 12 in response to the detection of the lighting device 5 and the light switch 6. The bridge 2 then searches for the upgrade servers 15, 16 of the lighting device 5 and of the light switch 6 in the wireless network 4 (step not shown in the figure). In this example, the bridge 2 first finds the upgrade server 15 of the lighting device 5, connects thereto and retrieves the digital asset from the upgrade server 15 of the lighting device 5.

Here, these operations are realized by means of ZigBee messages. In particular, in step S206, a ZigBee "MatchDescriptorRequest" message is sent from the bridge 2 to the upgrade server 15 of the lighting device 5 and, in response, a ZigBee "MatchDescriptorResponse" message is sent from the upgrade server 15 of the lighting device 5 to the bridge 2. In the ZigBee protocol, these messages form part of the discovery of an OTA upgrade server. The retrieval of the digital asset is then performed by means of a communication comprising, in step S207, the bridge 2 sending a ZigBee "QueryNextImageRequest" message to upgrade server 15 of the lighting device 5, which is answered by the upgrade server 15 of the lighting device 5 with a corresponding ZigBee "QueryNextImageResponse" message, and, in step S208, the bridge 2 sending a ZigBee "ImageBlockRequest"

message to the upgrade server 15 of lighting device 5, which is answered by the upgrade server 15 of the lighting device 5 with a corresponding ZigBee "ImageBlockResponse" message. The ZigBee "QueryNextImageRequest" message is normally used according to the ZigBee protocol to query the upgrade server of a master network element whether a new (firmware) image is available. In the present case, it is interpreted by the upgrade server 15 of the lighting device 5 as a query whether a (new) digital asset is provided by the by the upgrade server 15 of the lighting device 5. Moreover, according to the ZigBee protocol, firmware images are retrieved in blocks. Thus, in the present case, the bridge 2 retrieves the digital asset from the upgrade server 15 of the lighting device 5 in blocks, using the ZigBee "ImageBlockRequest" message.

After the retrieval of the digital asset from the upgrade server 15 of the lighting device 5 has been completed, the bridge 2, in step S209, transmits a completion information indicative of the completion of the retrieval of the digital asset from the upgrade server 15 of the lighting device 5. Here, the completion information is a ZigBee "EndRequest" message, which is answered by the lighting device 5 with a corresponding ZigBee "EndResponse" message. In response to the reception of the completion information, in step S210, the lighting device 5 then stops providing its upgrade server 15 in the wireless network 4.

Since the bridge 2 has also detected the light switch 6, it now searches for the upgrade server 16 of the light switch 6, and, upon detection thereof, the same steps as described above are performed by the bridge 2 and the light switch 6 (collectively denoted as step S211 in the figure).

Since no further device to be integrated into the connected lighting system 1 has been detected, and the bridge 2 has retrieved all relevant information from the lighting device 5 and from the light switch 6, the bridge 2, in this embodiment, performs further operations that may depend on the specific application (denoted as step S212 in the figure), and, in step S213, again provides its own upgrade server 12 in the wireless network 4. As described above, the upgrade server 12 of the bridge 2 may make available for retrieval a digital asset comprising, for example, a firmware update for updating the firmware of a device. In steps S214 and S215, the lighting device 5 and the light switch 6 each search for the upgrade server 12 of the bridge 2 in the wireless network 4 and, in the following, may each retrieve the digital asset from the upgrade server 12 of the bridge 2 (not shown in the figure). As described above, the search is only started a predetermined delay time after the lighting device 5 and the light switch 6 have been added to the wireless network 4.

Other variations to the disclosed embodiments can be understood and effected by those skilled in the art in practicing the claimed invention, from a study of the drawings, the disclosure, and the appended claims.

In the connected lighting system 1 shown in FIG. 1, the lighting device 5 can also be a device that has been used before (or was intended to be used) in a "standalone" device configuration, in which, for instance, a controller, such as a remote control or a light switch, directly controls the lighting device 5. In this situation, in order to transfer the device from the "standalone" device configuration to the connected lighting system 1 comprising the bridge 2, it can be helpful, as one step in this process, to transfer the parts of the standalone configuration that are known by the device itself to the master network device. This can be achieved if the digital asset made available by the upgrade server of the lighting device 5 comprises an information indicative of the configuration of the lighting device 5.

Moreover, in the connected lighting system 1 shown in FIG. 1, the information indicative of the identity of the lighting device 5 can be an element defined by the ZigBee protocol, for instance, a "device type" element, which identifies a certain ZigBee device.

It is noted that the connected lighting system 1 shown in FIG. 1 further comprises a lighting device 3. This may be, for instance, a device from a third party manufacturer that has already been integrated into the connected lighting system 1 and that provides corresponding features and characteristics as the lighting device 5 and/or the light switch 6. However, the lighting device 3 can also be a device that has been provided by the manufacturer of the connected lighting system 1 and that is therefore already known by the connected lighting system 1, such that further knowledge about specific characteristics of the device may not be needed for integrating and/or controlling the lighting device 3. In this case, the lighting device 3 may not be able to provide an upgrade server in the wireless network 4 for making available for retrieval a digital asset indicative of a characteristic of the lighting device 3. In the claims, the word "comprising" does not exclude other elements or steps, and the indefinite article "a" or "an" does not exclude a plurality.

Apart from the scenarios described above, the present invention can also be beneficially employed in a case where a manufacturer wants to introduce a new version of a device with new or improved functionality. The new device may then comprise a firmware image for upgrading earlier versions of the device. When a user buys such a new device, he/she may be offered to upgrade older devices he/she already has through the described server-based mechanism. In other words: In this scenario, the digital asset of the device to be integrated into the connected device system comprises a firmware image for upgrading earlier versions of the device. When the device is added to the wireless network, the master network device can retrieve the firmware image from the upgrade server of the device and make it available for retrieval by the earlier versions of the device via its own upgrade server. This can have the advantage that the manufacturer does not need to set-up a special firmware distribution channel. Instead, a user can upgrade earlier versions of a device, if he/she buys a new device.

A single unit or device may fulfill the functions of several items recited in the claims. The mere fact that certain measures are recited in mutually different dependent claims does not indicate that a combination of these measures cannot be used to advantage.

Procedures like the announcement of the device to be integrated into the connected device system or the search for the upgrade server of the device in the wireless network in response to the detection of the device performed by one or several units or devices can be performed by any other number of units or devices. These procedures and/or the control of the connected device system in accordance with the integration method can be implemented as program code means of a computer program and/or as dedicated hardware. In particular, the control of the connected device system in accordance with the integration method can be implemented in the device to be integrated into the connected device system and in the master network device, wherein the implementations in these devices cooperate for controlling the connected device system in accordance with the integration method.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A connected device system, comprising:
a master network device and a device to be integrated into the connected device system, wherein the connected device system is adapted to connect the master network device and the device via a wireless network,
wherein the device is adapted, when being added to the wireless network, to announce itself in the wireless network and to provide an upgrade server in the wireless network, wherein the upgrade server makes available for retrieval a digital asset indicative of a characteristic of the device, and
wherein the master network device is adapted to detect the device in the wireless network based on the announcement, to search for the upgrade server of the device in the wireless network in response to the detection of the device, and to retrieve the digital asset from the upgrade server of the device,
wherein the master network device is adapted to provide an master upgrade server in the wireless network and to stop providing the master upgrade server in the wireless network in response to the detection of the device.

2. The connected device system as defined in claim 1, wherein the device is adapted to stop providing the upgrade server in the wireless network after the retrieval of the digital asset from the upgrade server of the device has been completed and/or after a predetermined delay time.

3. The connected device system as defined in claim 1, wherein the master network device is adapted to transmit a completion information indicative of the completion of the retrieval of the digital asset from the upgrade server of the device, wherein the device is adapted to perform the stopping in response to the reception of the completion information.

4. The connected device system as defined in claim 1, wherein the master network device is adapted, if a further device to be integrated into the connected device system has been detected, to search for the upgrade server of the further device to be integrated into the connected device system after the retrieval of the digital asset from the upgrade server of the device has been completed.

5. The connected device system as defined in claim 1, wherein the master network device is adapted, if no further device to be integrated into the connected device system has been detected, to provide an upgrade server in the wireless network after the retrieval of the digital asset from the upgrade server of the device has been completed.

6. The connected device system as defined in claim 1, wherein the master network device is adapted to provide an master upgrade server in the wireless network, wherein the device is adapted to search for the master upgrade server of the master network device in the wireless network, wherein the search is only started after a predetermined delay time.

7. The connected device system as defined in claim 1, wherein the digital asset comprises one or more of an information indicative of a type and/or variant of the device and an information indicative of the identity and/or configuration of the device.

8. The connected device system as defined in claim 1, wherein the master network device is adapted to locally store the contents of the digital asset and to associate them with the device.

9. The connected device system as defined in claim 1, further comprising:
a mobile device that is adapted to connect to the master network device and to execute a program for wirelessly controlling the device via the master network device,
wherein the master network device is adapted to make the contents of the digital asset available to the mobile device.

10. The connected device system as defined in claim 1, wherein the connected device system is a connected lighting system.

11. A master network device for being used in a connected device system as defined in claim 1,
wherein the master network device is adapted to detect the device in the wireless network based on the announcement, to search for the upgrade server of the device in the wireless network in response to the detection of the device, and to retrieve the digital asset from the upgrade server of the device.

12. A device for being used in a connected device system as defined in claim 1,
wherein the device is adapted, when being added to the wireless network, to announce itself in the wireless network and to provide the upgrade server in the wireless network, wherein the upgrade server makes available for retrieval a digital asset indicative of a characteristic of the device.

13. An integration method for integrating a device into a connected device system comprising a master network device and the device to be integrated into the connected device system, wherein the connected device system is adapted to connect the master network device and the device via a wireless network, wherein the method comprises:
the device, when being added to the wireless network, announcing itself in the wireless network and providing an upgrade server in the wireless network, wherein the upgrade server makes available for retrieval a digital asset indicative of a characteristic of the device, and
the master network device detecting the device in the wireless network based on the announcement, searching for the upgrade server of the device in the wireless network in response to the detection of the device, and retrieving the digital asset from the upgrade server of the device,
wherein the master network device is adapted to provide an master upgrade server in the wireless network and to stop providing the master upgrade server in the wireless network in response to the detection of the device.

14. A computer program for controlling a connected device system, wherein the computer program comprises program code means for causing the connected device system to carry out the integration method as defined in claim 13, when the computer program is run on the connected device system.

* * * * *